United States Patent Office 3,521,611  
Patented July 28, 1970

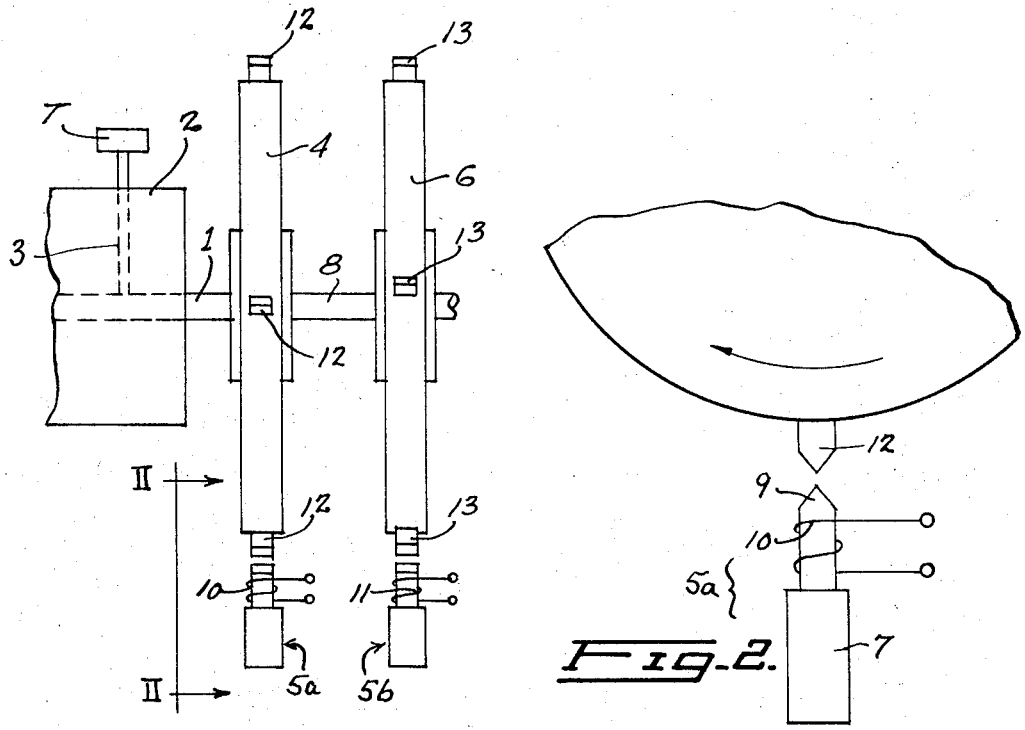
Fig. 1.
Fig. 2.
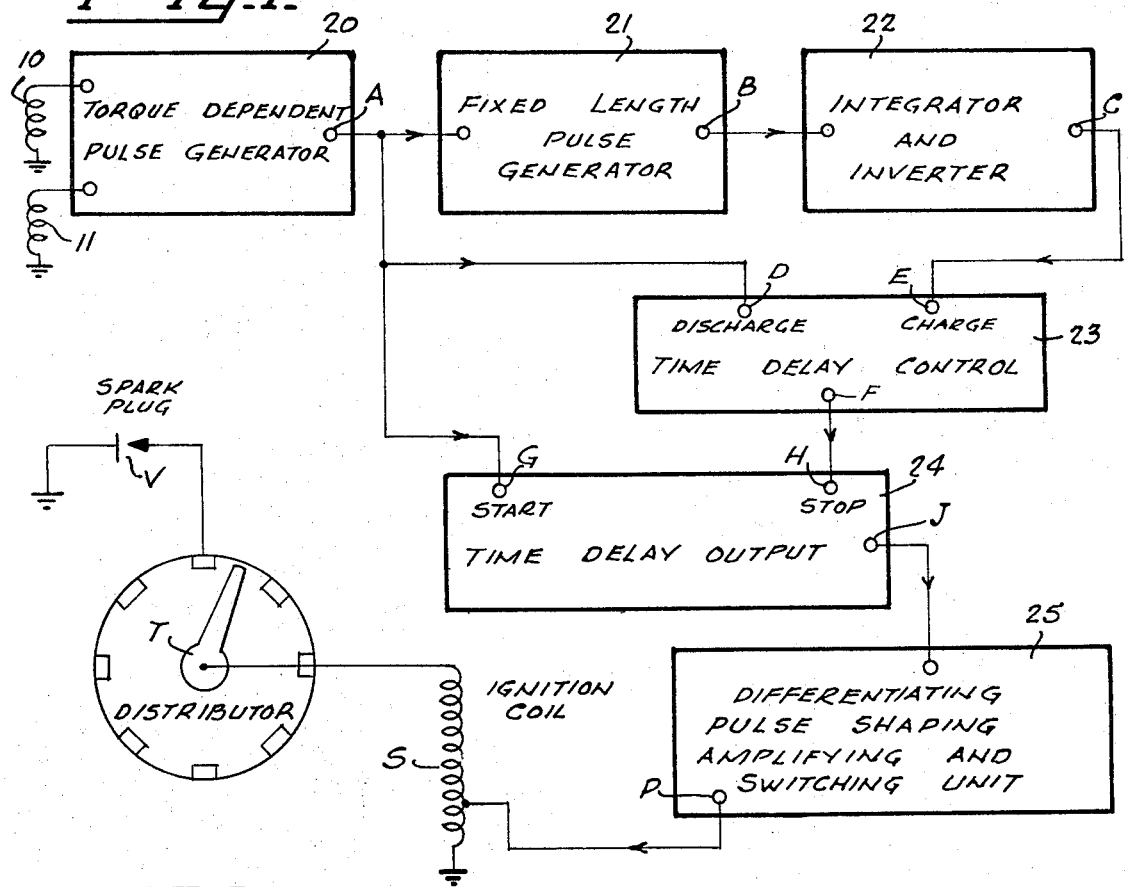
Fig. 3.

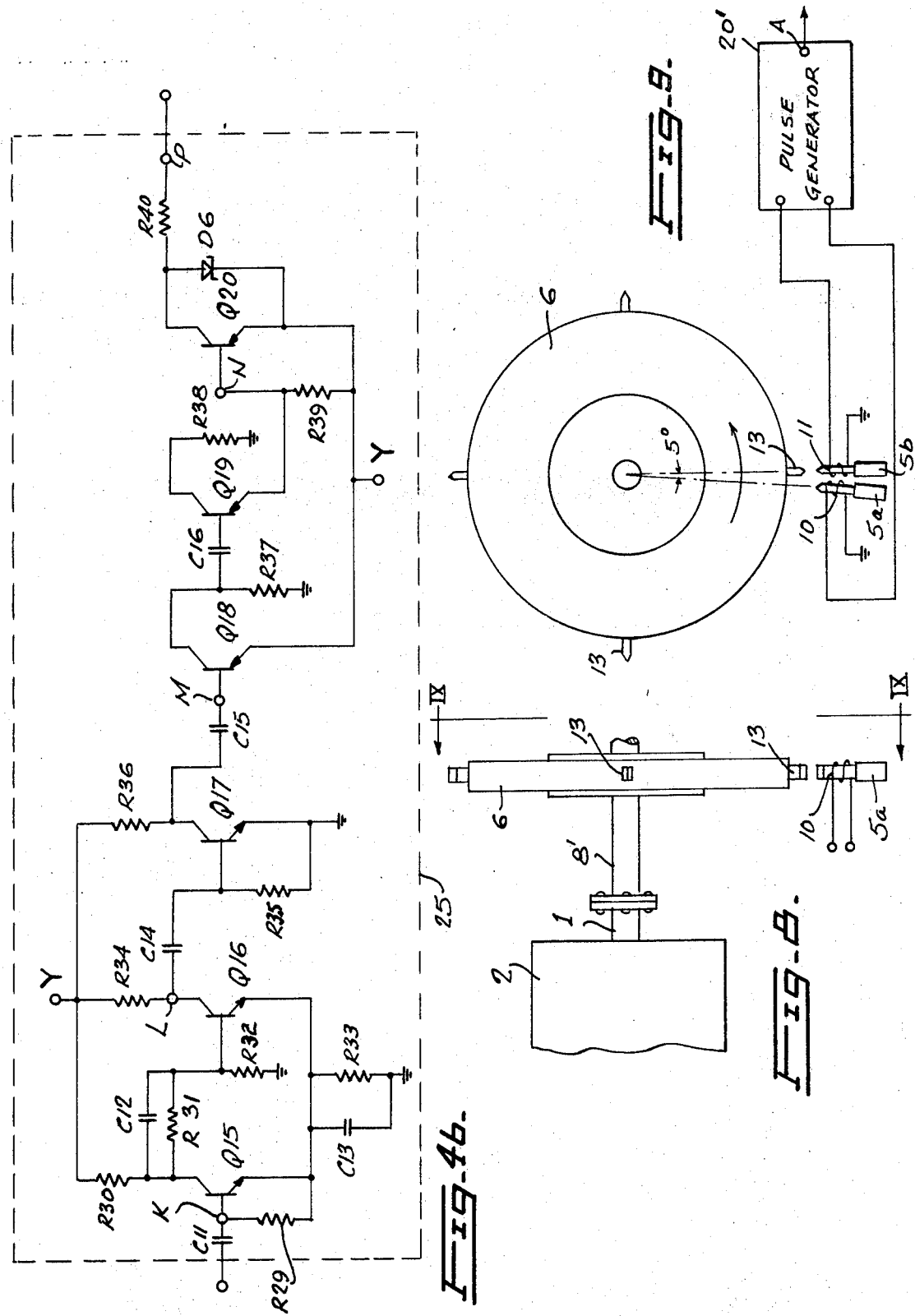

3,521,611  
IGNITION TIMING SYSTEM FOR AN INTERNAL COMBUSTION ENGINE  
Stanley Russell Finch, 10903 56th St., Edmonton 80, Alberta, Canada  
Filed Jan. 27, 1969, Ser. No. 794,128  
Int. Cl. F02p 5/00  
U.S. Cl. 123—146.5   7 Claims

ABSTRACT OF THE DISCLOSURE

The system employs two flywheels joined by a shaft flexible in torsion and transmitting the engine torque. Pins on these flywheels cooperate with stationary magnetic elements to generate electrical pulses to control the timing of the ignition coil. The frequency of the pulses is used to generate a speed-dependent signal. The spacing between the pulses received from the respective flywheels is used to generate a torque-dependent signal. These signals control the time of discharge and charge of a capacitor to provide an output to the ignition coil which is timed to be advanced in response to increased speed and to be retarded in response to increased torque.

---

In an alternative, the first flywheel (i.e. the one nearer the engine) is dispensed with, and its pins are transferred to the second flywheel which is connected to a part of the shaft remote from the engine so that a torque increase will delay the timing of the resultant pulses relative to the datum time represented by the crankshaft angle, and the ignition time will be correspondingly delayed.

The invention relates generally to an improved ignition timing system for an internal combustion engine.

Generally, internal combustion engines at present function by mixing fuel and air, compressing the mixture in a chamber, igniting it, and using the expansion of gases resulting from the heat of combustion to force down a piston which will, by its connection to the crankshaft, cause the crankshaft to rotate.

It is common to provide an electrical impulse, timed through a series of gears, chains, levers or other devices, in relation to the crankshaft rotation, to jump a gap inside the combustion chamber and produce a spark which will ignite the mixture. An interval of time elapses between the jumping of the gap by the spark, and full expansion of the gases with combustion. It is therefore necessary to ignite the mixture somewhat before the crankshaft reaches the position where the downward thrust of the piston will cause the crankshaft to rotate in the correct direction. This is commonly called spark advance and is timed "before top dead center."

The amount of the advance must vary: in the first case, because a change in engine speed will change the angle through which the crankshaft will rotate during the time of combustion; and in the second case, because changes in pressure and temperature within the chamber will change the combustion time.

In the first case it is common to use a device known generally as a "mechanical advance" which balances centrifugal force against spring tension by a series of weights, levers, and springs to provide a device sensitive to engine speed that will vary the advance in response to changes in engine speed. These devices are affected by an alteration of the balance of forces caused by any change in weight due to dirt, grease or wear, and any change in spring tension due to temperature change or wear. They are also affected in their movement by dirt, grease, or lack of it, and wear, and by any change in consistency of the grease due to a change in temperature.

In the second case it is common to use a device known generally as a "vacuum advance" which consists of a spring supported diaphragm connected to the intake manifold that will vary the amount of advance in response to the variation of the differences between the intake manifold pressure and atmospheric pressure. These devices operate on the assumption that a measurement of the variance between intake manifold pressures and atmospheric pressures will accurately reflect the pressures and temperatures within the combustion chamber. In fact, since the pressures and temperatures within the combustion chambers are not being measured directly, this provides, at best, only an approximation. These devices are furthermore subject to the same problems in moving as the first and are additionally affected by leaks in the pressure sensitive system, or become completely inoperative should the diaphragm become ruptured.

There are two important factors on which my invention is based. The first factor is that any change in the pressure in the combustion chamber will be reflected by a proportionate change in torque in the crankshaft and thus evaluation of the torque will provide a precise evaluation of this pressure. The second factor is that timing ignition from "top dead center" and advancing the ignition from this point in terms of degrees of rotation of the crankshaft is exactly the same as timing from the point of "maximum advance" and delaying the ignition from this point to accommodate engine speed and torque.

I have found that the difficulties previously outlined and embodied in the commonly used devices can be eliminated by replacing these devices with a system that will evaluate torque and engine speed and for minimum values of these functions initiate an ignition pulse at the point of "maximum advance" as used in the previously used devices (this is approximately 30° before "top dead center"). The present system produces a signal that will delay the ignition pulse from this "maximum advance" time in accordance with its evaluation of torque and engine speed. The ignition pulse is delayed in direct proportion to torque and inverse proportion to engine speed, although not necessarily exactly linearly. The timing follows the desired pattern of the commonly used devices, while providing more precision and freedom from servicing needs.

Numerous other advantages of my improved ignition control system will be apparent from the following specification when read in the light of the appended drawings. It must be understood that, while two specific embodiments are described and illustrated, various changes and modifications falling within the scope of the appended claims may be made without departing from the inventive spirit and the scope thereof.

In the drawings, illustrating the preferred embodiments:

FIG. 1 is a diagrammatic side view showing a portion of an internal combustion engine and certain mechanical parts of a first embodiment of a timing system according to the invention;

FIG. 2 is a section taken on the line II—II in FIG. 1;

FIG. 3 is a general block circuit diagram to operate with the mechanical structure shown in FIGS. 1 and 2;

FIG. 4b is a second part of this detailed circuit diagram, FIGS. 4a and 4b together providing the detailed circuits for the generalised block diagram of FIG. 3;

FIG. 6b is a variant of FIG. 6a;

FIG. 8 shows a side view of the mechanical structure of a second embodiment of the invention, this figure otherwise corresponding generally to FIG. 1;

FIG. 9 is a view taken on the line IX—IX in FIG. 8; and

Figure 4A:
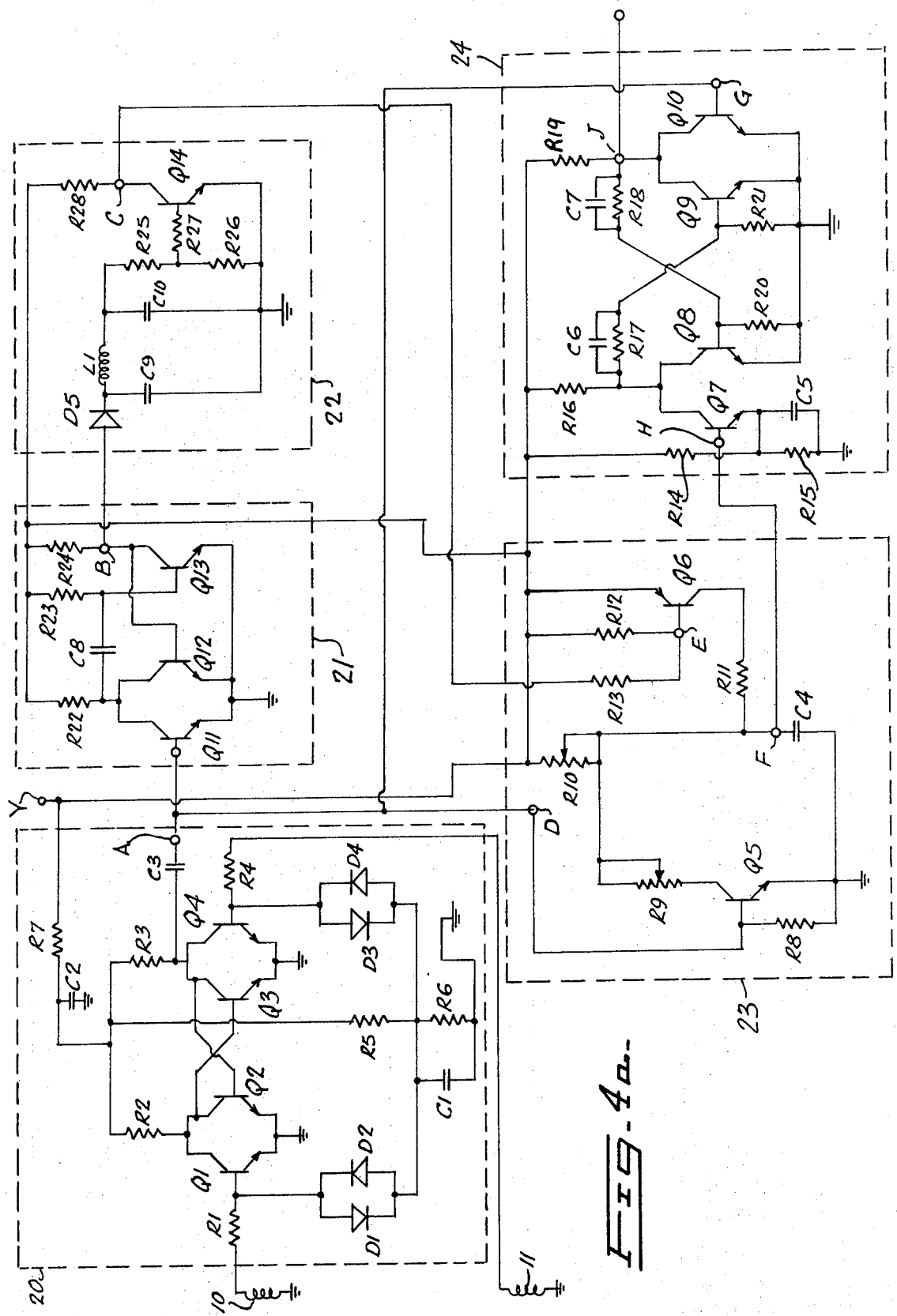
FIG. 4a is a first part of a detailed circuit diagram.

With reference first to FIGS. 1 and 2, an internal combustion engine shown diagrammatically at 2 has a crankshaft 1 driving through a section of transmission shaft 8 to a further device (not shown), such as a gear box or an automatic transmission or some other load. The shaft 8 is formed of such a material and with such dimensions that it will twist appreciably as a result of the torque transmitted through it. Two flywheels 4 and 6 are provided. The flywheel 4 is located at the end of the shaft 8 adjacent the crankshaft 1, so that such flywheel 4 rotates synchronously with the crankshaft with a timing that is substantially independent of the torque being transmitted. The second flywheel 6 is located remote from the engine 2, so that its rotational position relative to the flywheel 4 and hence relative to the crankshaft 1 will reflect any torsional flexure of the shaft 8 and thus the amount of torque being transmitted.

The engine 2, in addition to its many other conventional parts, includes a distributor T that has the usual timing connection to the crankshaft 1, a feature diagrammatically illustrated by the dotted lines 3.

The first flywheel 4 has four pins 12 of soft iron or other magnetic material arranged uniformly around its periphery. The adoption of four pins corresponds to an eight cylinder engine. A six cylinder engine would require three such pins disposed symmetrically around the flywheel perimeter, assuming an engine with a four-stroke cycle.

Each of the pins 12 is arranged to pass close to a stationary magnetic assembly 5a consisting of a pole piece 9 of magnetic material connected to a permanent or electromagnet 7 (FIG. 2). An electrical winding 10 extending around the pole piece 9. As will be best seen from FIG. 2, each pin 12 and the pole piece 9 are tapered towards relatively fine edges, in order to define precisely the moment at which the edge of each pin 12 approaches closest to and starts again to recede from the tip of the pole piece 9. The form of pulse generated in the winding 10 by this action is shown at 15 in FIG. 5, such pulse consisting of a gradual change of voltage in a first direction, followed by a sudden and rapid reversal of the sign of the voltage, followed by a final tapering away. The circuit that receives the pulse 15 from the winding 10 is adapted to sense this sudden reversal of polarity, i.e. to detect the moment represented approximately by the point 14 which provides a very precise timing of the exact moment when the edge of each pin 12 travels past the edge of the pole piece 9.

Figure 5:
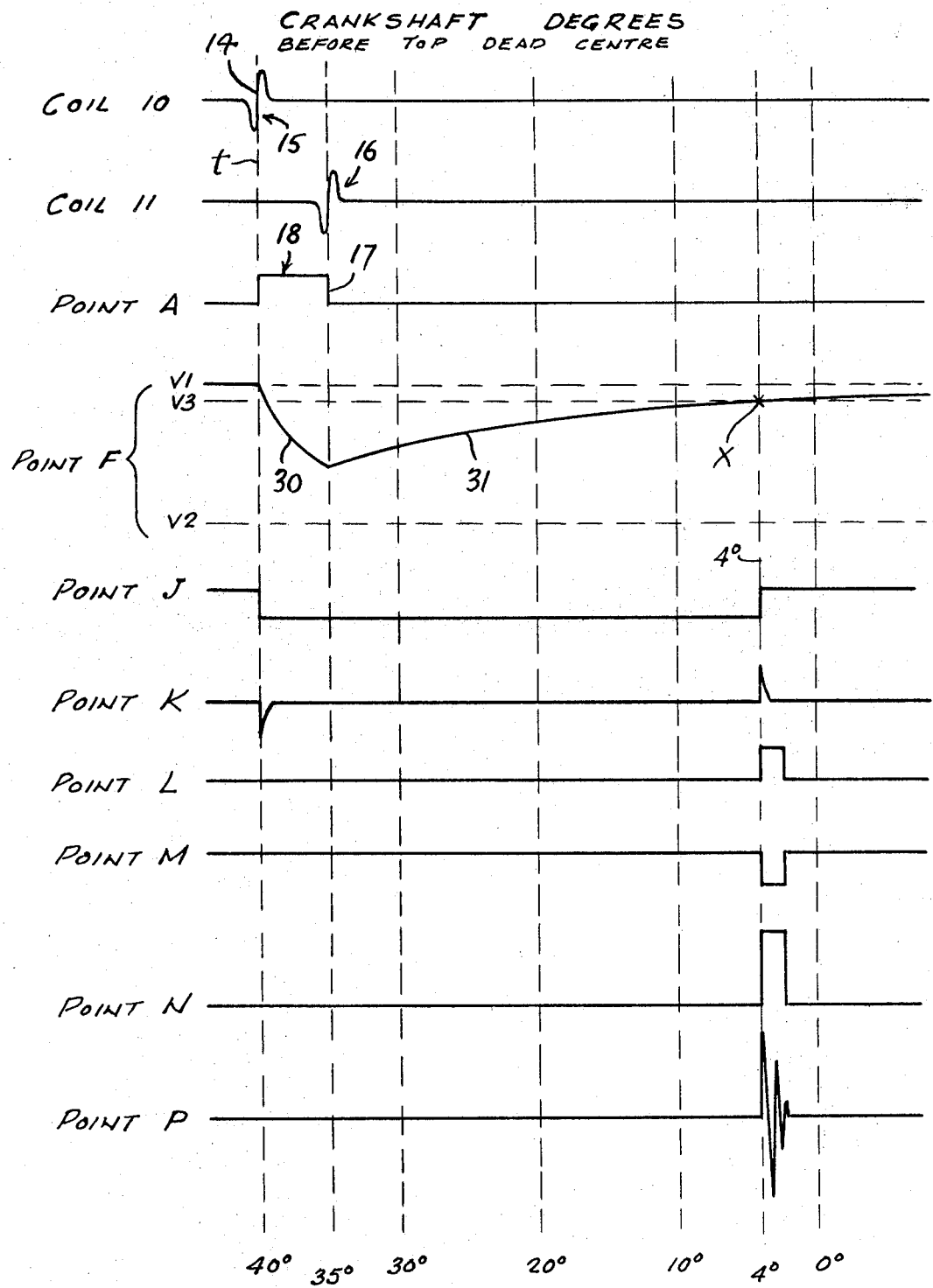
FIG. 5 is a first pulse diagram with the pulses shown plotted against crankshaft degrees.

Similar pins 13 are provided around the periphery of the second flywheel 6, these pins cooperating with a similar stationary magnetic assembly 5b including an electrical winding 11. Under conditions of no torque, the pins 13 are so located as to lag 5° behind the pins 12, i.e. to produce a similar pulse 16, as also shown in FIG. 5. The timing of these pulses is coordinated with that of the crankshaft, the first one appearing at 40° before top dead centre and the second at 35° before top dead centre (assuming no transmitted torque). Each such associated pair of pins 12 and 13 will cooperate with two of the eight spark plugs, the timing in relation to top dead centre applying to the pistons in the cylinders containing these two spark plugs. No attempt has been made in the pulse diagrams to show more than a single pair of pulses for providing the ignition timing for a pair of cylinders having their pistons 360° out of phase with each other.

As will be seen from FIGS. 3 and 4, the windings 10 and 11 provide the inputs to a torque dependent pulse generator 20 which takes the form of a conventional flip-flop multivibrator shown operating with transistors Q1 to Q4; resistors R1 to R6; capacitors C1 to C3 and diodes D1 to D4. This multivibrator is supplied from a direct current source Y through a resistor R7 and is effectively decoupled by the capacitor C2. As soon as the pulse 15 from the coil 10 goes positive, i.e. at point 14, the transistor Q1 conducts, thus causing the multivibrator to generate a positive voltage at the junction of the resistor R3 and the collector of the transistor Q4. When a pin 13 generates the pulse 16 in the coil 11, this pulse switches on the transistor Q4, causing the multivibrator to reverse and lower the voltage at the collector of the transistor Q4 substantially to ground. These voltage changes pass through the capacitor C3 to point A which constitutes the output of the pulse generator 20. The wave-form 18 at the point A is shown in FIG. 5.

Figure 6A:
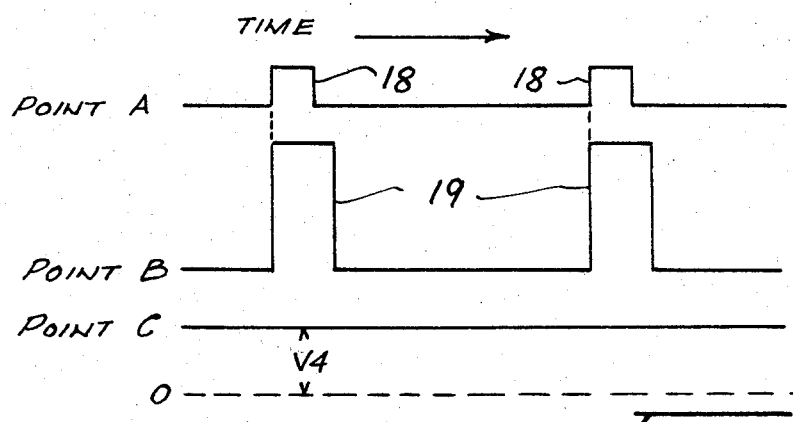
FIG. 6a is a furher pulse diagram with the pulses shown plotted against time.
Figure 6B:
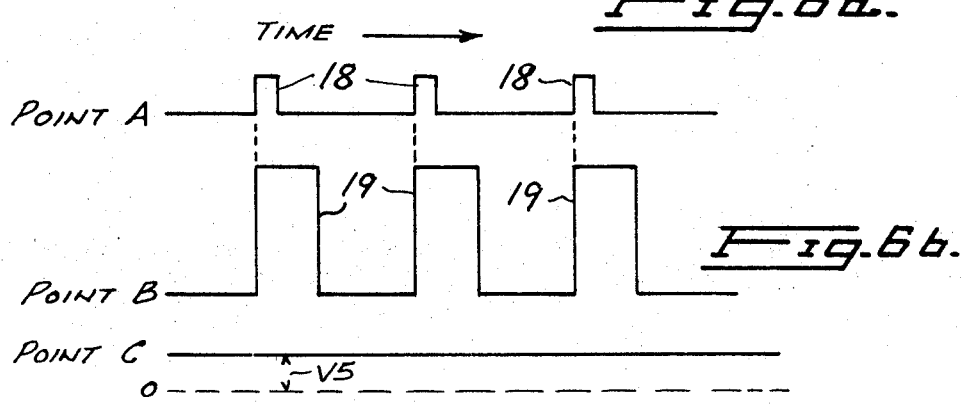

This square wave 18 at the point A is of constant amplitude. Its "on" time in terms of crankshaft degrees is constant, but, in terms of absolute time, it diminishes directly with the speed of rotation of the shaft 8. This variation is illustrated by FIGS. 6a and 6b, FIG. 6a showing the square wave-form 18 at a first speed, while FIG. 6b shows the same wave-form at double such speed. It will be noted that the frequency of the pulses has been doubled while their length has been halved. The length of the pulses 18 at point A is also dependent on the torque being transmitted. Assuming torsional flexure in the shaft 8 at high torque sufficient to increase the lag of the pins 13 behind the pins 12 from 5° to 10°, the pulses 18 at point A will be lengthened to 18' in the manner shown at A' in FIG. 7. This latter figure illustrates the elongation of the pulses 18 in relation to crankshaft degrees; they will of course also be lengthened in relation to clock time by the increase of transmitted torque.

The output from point A is fed to three different circuits. Firstly, consideration will be given to a fixed length pulse generator 21 to which the output of the generator 20 is fed. This circuit 21 is shown in FIG. 4 as comprising a mono-stable multivibrator consisting of transistors Q11 to Q13; resistors R22 to R24 and capacitor C8. This multivibrator produces positive-going pulses 19 of fixed length at its output point B, i.e. at the junction of the resistor R24 and the collector of the transistor Q13. These pulses 19 are illustrated in FIGS. 6a and 6b. Their length is constant, being determined by the settings of the circuit 21. Each pulse 19 is triggered by commencement of a pulse 18 at point A, thereby reflecting the frequency increase of the pulses 18 with increased shaft speed. But the pulses 19 do not reflect the shortening of the pulses 18 that is also a consequence of an increase of shaft speed.

The fixed length pulse generator 21 feeds to an integrator and inverter circuit 22 which comprises a diode D5; inductor L1; transistor Q14; resistors R25 to R28; and capacitors C9 and C10. This circuit generates a voltage at the base of the transistor Q14, the value of which varies in direct proportion to engine speed. In other words, taking the FIG. 6b situation, the fact that there are twice as many pulses 19 received from the point B generates twice the positive voltage on the base of the transistor Q14. This transistor acts as an inverter, by conducting in proportion to the voltage applied to its base, which generates a voltage at its collector (point C) that is inversely proportional to engine speed. Two values of this voltage are shown in FIGS. 6a and 6b as voltages V4 and V5 respectively, the voltage V5 being approximately half the voltage V4.

The next circuit that will be considered is a time delay control circuit 23 having input points D and E connected respectively to points A and C. The circuit 23 consists of transistors Q5 and Q6; resistors R8 to R13 and capacitor C4. The incoming signal from point A at the base of the transistor Q5 turns this transistor on to saturation, which action allows the capacitor C4 to discharge at a rate controlled by the adjustable resistor R9. The transistor Q5 ceases to conduct at the trailing edge 17 of the input pulse 18 received from point A, whereupon the capacitor C4 begins to recharge.

There are two paths for this recharging. The first is through the resistor R10 which will be adjusted to have a value such that, under conditions of no torque and very low shaft speed, it will allow the capacitor C4 to recharge in correct time to initiate proper ignition for this speed and torque condition, i.e. nearly at top dead centre. The second recharging path for the capacitor C4 is through the transistor Q6 and the resistor R11, the current available through this path being controlled by the voltage at point E (the base of the transistor Q6), such voltage being the same as that generated at point C, the output of circuit 22, this voltage being inversely proportional to engine speed, as has already been explained. By control of the biasing of the transistor Q6, it is possible to cause it to pass just the right amount of current to recharge the capacitor C4 in the correct time to bring about the earlier ignition timing required to accommodate any increase in engine speed.

Figure 7:
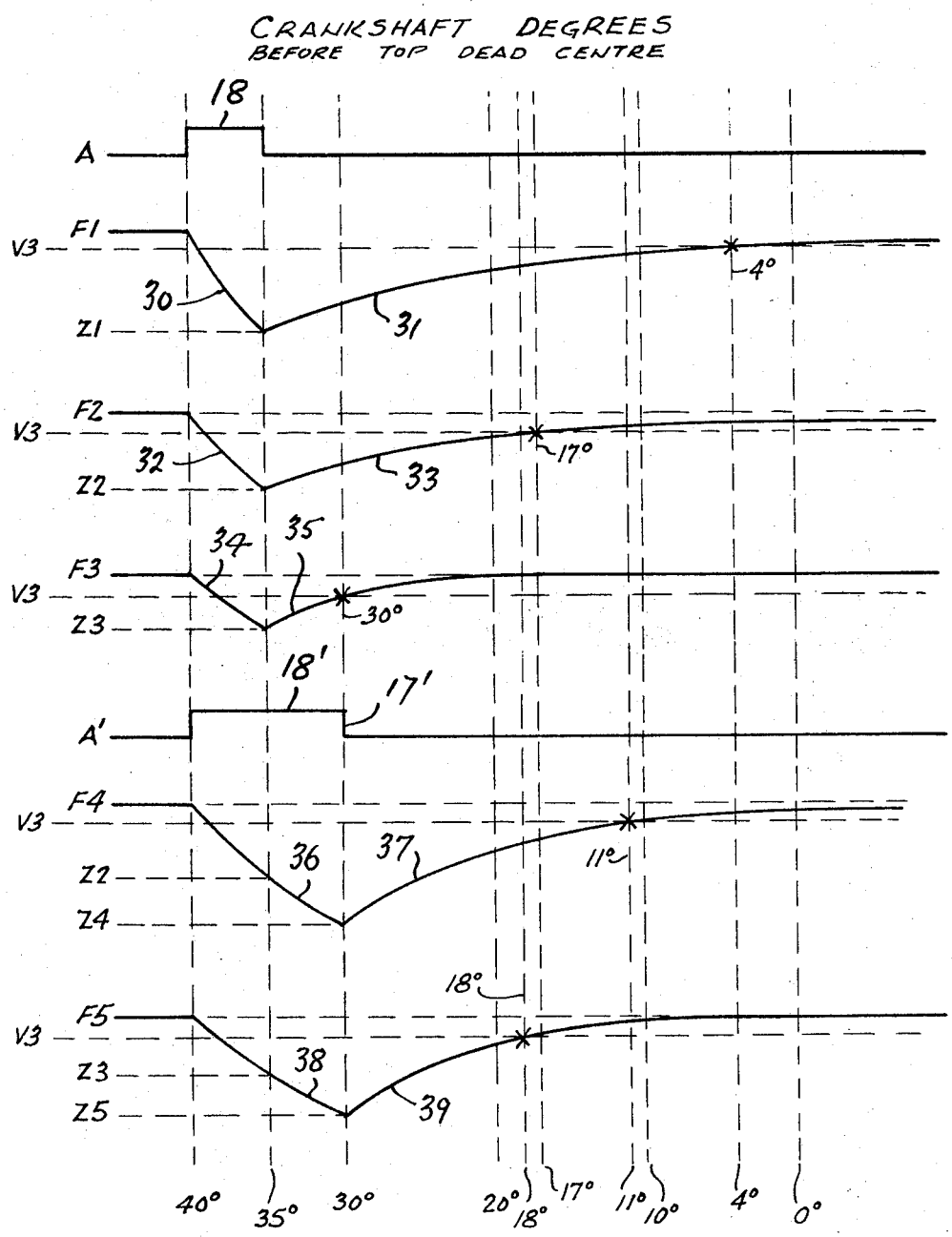
FIG. 7 is a further pulse diagram showing variations of the pulses of FIG. 5.

The voltage at point F, which voltage is that across the capacitor C4, is illustrated in FIGS. 5 and 7 for various different conditions of torque and speed. Referring firstly to FIG. 5, which shows this voltage under conditions of no torque and low speed, it will be noted that the capacitor C4 discharges during the curve 30 from a first voltage V1 towards a second voltage V2, e.g. ground. It does not have sufficient time to reach the voltage V2, however, before the discharging action is interrupted by the trailing edge 17 of the pulse from point A, whereupon a recharging curve 31 immediately commences. Because the engine is rotating at low speed and the first charging path for the capacitor C4 is dominant, the charging rate is comparatively slow and it is not until 4° before top dead centre that the curve 31 at point X passes a voltage V3 that has been selected as the critical voltage for energizing the next circuit, as will be further explained below.

This same pair of curves 30 and 31 have been reproduced unchanged as a composite curve F1 in FIG. 7, the low point to which the capacitor discharges having been designated Z1. FIG. 7 also shows corresponding curves F2 and F3 that represent conditions at medium speed and high speed respectively, still however with substantially no transmitted torque. Portion 32 of curve F2 is flatter than the portion 30, the reason for this being that the true clock time between the two crankshaft positions shown, i.e. 40° and 35° before top dead centre, has been reduced by the increased engine speed, the capacitor C4 now having sufficient time only to discharge to a voltage Z2. Due to the increased shaft speed, the voltage at point C will be reduced, as already demonstrated by FIG. 6b, hence allowing more current to pass through the transistor Q6 and contribute to charging of the capacitor C4 more quickly along the curve 33. As a result the curve F2 now reaches the voltage V3 at 17° before top dead centre. Curve F3, representing high speed conditions, shows an even flatter discharge curve 34 to reach a voltage Z3, and a steeper charge portion 35 to cross the voltage V3 at 30° before top dead centre. The ignition timing will be advanced accordingly, in the manner more fully described below.

The lower part of FIG. 7 illustrates the effect of an increase to high torque. A medium speed condition curve F4 includes a discharge curve 36 and a recharging curve 37. It will be noted that the curve 36 initially follows the curve 32 down to the voltage Z2, but continues on for another 5° of crankshaft angle to the voltage Z4, because the turning off of the discharge transistor Q5 is now delayed until the trailing edge 17' of the elongated pulse A'. Under these conditions, the curve F4 will typically cross the voltage V3 at about 11° before top dead centre. Finally in FIG. 7, the curve F5 shows conditions of high speed and high torque, consisting of a discharge curve 38 continuing past the voltage Z3 to a voltage Z5 and a recharging curve 39 crossing the voltage V3 at approximately 18° before top dead centre. As will be clearly evident from this figure, the effect of these variations is an advancement of the ignition timing with increase in speed, plus a superimposed retardation of such timing with increased torque. Although expressed in terms of a net advancement from top dead centre, each of these timing moments is in practice calculated by the circuit as a variable delay from the maximum advance condition of approximately 30° before top dead centre.

The description now turns to a consideration of the next circuit which is a time delay output circuit 24 having input points G and H and an output point J, the input points being respectively connected to points A and F. This circuit 24 comprises transistors Q7 to Q10; resistors R14 to R21 and capacitors C5 to C7, and constitutes a modified flip-flop multivibrator which is triggered "on" by the commencement of the signal from the point A and "off" by the signal from point F, that is to say when the voltage at point F reaches the value V3, which value is set by the bias on the transistor Q7. The resulting output at point J is illustrated in FIG. 5.

This output is fed to the next circuit which is a differentiating, pulse shaping, amplifying and switching unit 25 that consists of transistors Q15 to Q20; resistor R29 to R40; capacitors C11 to C16 and Zener diode D6. The input signal received from the point J is differentiated by the combination of the capacitor C11 and the resistor R29 to produce the sharp pulses at point K shown in FIG. 5. Only the positive-going one of these pulses, coinciding with the end of the pulse from the point J, is of further concern, since the negative-going pulse has no effect on the NPN transistor Q15. The positive-going pulse causes this transistor to conduct and trigger the transistor Q16 of a monostable multivibrator which produces a positive-going square wave at point L, the leading edge of such wave occurring at the crankshaft location predetermined by the crossing of the voltage V3 by the recharging curve of the capacitor C4, as clearly shown in FIG. 5. This signal at point L is inverted, amplified and reinverted in a conventional manner through points M and N of the remainder of the circuit 25, the output at point N still being essentially a square wave.

The positive leading edge of the pulse at point N causes the transistor Q20 suddenly to cease conduction, thus allowing the magnetic field from the primary winding of an ignition coil S to collapse, inducing a high voltage in the secondary winding of this coil, which in turn produces a surge voltage in the primary winding, as shown at point P in FIG. 5. This wave-form shown at point P also represents the high tension voltage induced in the secondary winding of the ignition coil S and hence the voltage that is passed through the distributor T to the spark plugs, as represented by a typical spark plug V. This surge voltage is bled to ground through the Zener diode D6, thus protecting the switching transistors, the resistor R40 serving to limit the current flow in the transistor Q20 during conduction.

The operation so far described can be summarised by saying that two pulses 15, 16 are generated by rotation of the drive shaft, these two pulses being used to control the ignition timing. The first pulse 15 is created at a point of crankshaft rotation that is fixed in relation to the piston of the cylinder that it fires. The second pulse 16 is timed at a fixed minimum angle after the first pulse, so that the interval between the two pulses will be a constant in terms of crankshaft degrees, except when the second pulse is delayed by deflection of the coupling shaft 8 due to transmitted torque, the increase of this angle between the two pulses being substantially linearly proportional to the torque increase. A pulse 19 switched on in response to the first pulse 15 remains on for a fixed time, a change of speed producing a corresponding change of frequency of this latter pulse 19, so as when integrated to provide a voltage output V4, V5 inversely proportional to speed.

The first pulse 15 switches a multivibrator "on," and the second pulse 16 switches it "off," such multivibrator while "on" controlling discharge of a capacitor C4. The speed responsive voltage is used to control the rate of recharging of the capacitor, a further multivibrator being connected to this capacitor and being so biased as to produce a square wave (point J) the trailing edge of which is switched by the capacitor C4 when its voltage reaches a predetermined level V3. This latter switching provides the necessary signal that is delayed in response to torque and increased in response to speed, such signal then being used to control the energization of the ignition coil.

It will be noted that only the current through the secondary of the ignition coil S feeds through the distributor T, this arrangement providing a greater proportion of the time between firings than is usual in conventional ignition systems as build-up time for the magnetic field in the ignition coil. This has the advantage of extending the speed range of the engine.

While in the example shown in FIGS. 1 and 2, the pulses are produced by pins of magnetic material passing the stationary magnetic assemblies 5a, 5b, it will be understood that any other suitable magnetic anomalies distributed appropriately around the flywheels or otherwise caused to rotate with the shaft can be used in substitution for the pins 12 and 13 for generating the input pulses. The specific arrangement shown in FIGS. 1 and 2 is preferred, however, because it enables the generation of sharp pulses with steep waveforms that provide a precise indication of the moment when a pin 12 or 13 passes the associated stationary magnetic assembly. In addition, this arrangement is relatively insensitive to extraneous influences, such as the presence of foreign matter or external magnetic fields.

As will have been apparent from the foregoing description, the crankshaft datum time t of 40° before top dead centre has been provided in the first embodiment of the invention by virtue of the pulse 15 from the coil 10, with which pulse 15 the leading edge of the pulse 18 at the point A coincides.

In a second embodiment of the invention illustrated in FIGS. 8 and 9, this feature is modified, the crankshaft datum time no longer being fed into the electronic circuit, although of course it remains inherent in the instantaneous position of the crankshaft itself. In this second embodiment, the first flywheel 4 is dispensed with and the flywheel 6 is arranged at a portion of a shaft 8' remote from the engine 2, the shaft 8' being assumed to be flexible in torsion in essentially the same manner as the shaft 8, so that the angular position of the flywheel 6 will lag behind the angular position of the crankshaft 1 by an amount dependent on the torque being transmitted. The pins 13 on the flywheel 6 now cooperate with the two stationary magnetic assemblies 5a and 5b which continue to bear respective windings 10 and 11 that feed, as before, into a pulse generator circuit 20' that is identical with the circuit 20 except that it now no longer produces an output at the point A that is torque dependent. The length of the output pulse at the point A in FIG. 9 is now fixed in terms of crankshaft degrees by the angular spacing between the assemblies 5a and 5b.

Under conditions of no torque, the output pulse 18 at this point A is essentially the same as in the first embodiment. In other words, this pulse has a leading edge at 40° before top dead centre and a trailing edge at 35° before top dead centre, a relationship that must of course be initially set up by appropriate adjustment of the position of the flywheel 6 in relation to the crankshaft itself.

Figure 10:
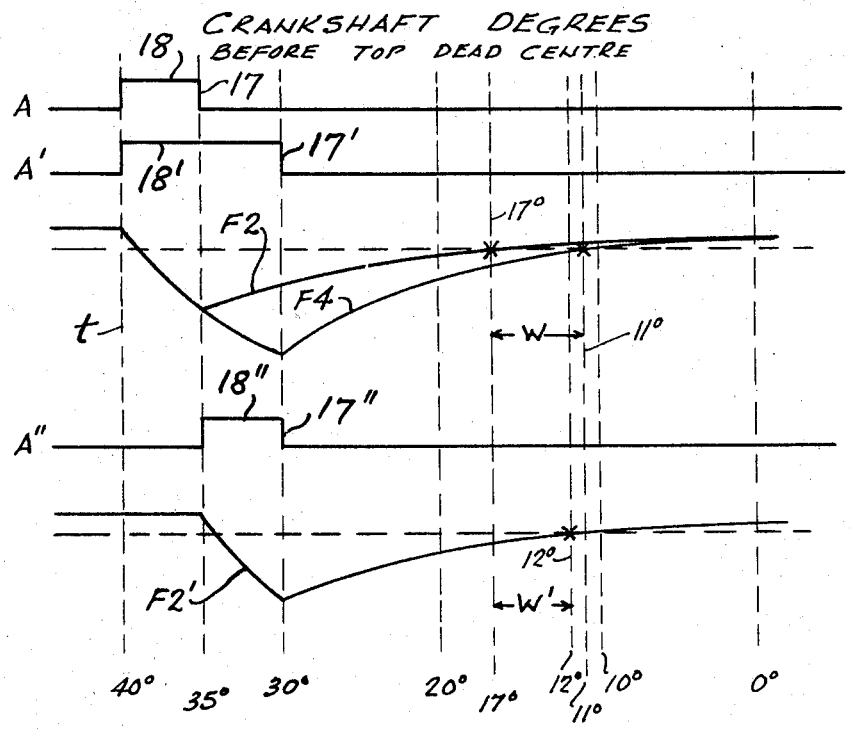
FIG. 10 is a final pulse diagram contrasting the performance of the two embodiments of the invention.

When the arrangement shown in FIGS. 8 and 9 is transmitting high torque, the effect is to delay both the input pulses to the pulse generator circuit 20', by say 5°, resulting in an output pulse 18" at the point A as shown at A" in FIG. 10. This figure serves to compare the two embodiments, the curves F2 and F4 of the voltage at point F already described in connection with FIG. 7 having been reproduced in superimposed form in FIG. 10 together with a voltage curve F2' which is representative of the voltage at the point F when the pulse from the point A is as shown at A". Curve F2' is the curve F2 unchanged in shape but delayed by 5°. As already explained, the difference between the curves F4 and F2 is that the curve F4 represents an increase in torque at constant speed, with a resultant retardation of the ignition timing by the distance W, i.e. approximately 6°. In the second embodiment shown in the lower part of FIG. 10 the retardation of the ignition resulting from the transmission of the same increased torque is shown at W', which in this case is approximately 5°. Hence, a comparable result has been achieved. If a more exact correspondence between the performances of the two embodiments is required, this can readily be achieved by variation of the flexibility of the shaft 8'. For example, if this shaft were made to flex by 6° for the torque difference represented by the curves F2 and F4, the values for W and W' would be exactly equal to each other.

This second embodiment has the advantage that it eliminates the need for the first flywheel and thus simplifies the device. The advantage afforded by the first embodiment, however, is that is provides more freedom of choice in the degree of flexibility of the shaft 8. As has just been demonstrated, the shaft 8' must physically deflect the same number of degrees as the ignition retardation required. In other words, the retardation W' is directly equal to the torsional flexure of the shaft 8'.

While in the illustrated example of the first embodiment the retardation W achieved between curves F2 and F4 (i.e. 6°) does not differ greatly from the five degrees of torsional flexure of the shaft 8 that has been assumed to result from high torque, this approximate correspondence of values is not forced on the designer. By adjustment of the settings in the electronic circuit, the shapes of the curves 32, 33, 36 and 37 making up the curves F2 and F4 can be adjusted, if so desired, such that the value for W remains substantially at 6°, while the elongation of the pulse A into the pulse A' is a good deal less than 5°. In other words, if it is found preferable from the viewpoint of choice of materials and other design considerations, to have a relatively stiff shaft 8, so that elongation of the pulse A into the pulse A' is only a degree or so, this small deflection can be effectively amplified electronically to produce the same or substantially the same value for the retardation W, indeed any other desired value for this function.

To summarise the invention in its broad aspects while at the same time facilitating a ready understanding of the claims appended hereto, the main claim will now be reproduced as a statement of invention but with the addition of reference characters.

Thus the invention may be defined as an improved ignition timing system for controlling the ignition means S of an internal combustion engine, said timing system comprising (a) A transmission shaft 8 (or 8') connected to the engine crankshaft 1 for transmission of torque, said transmission shaft being flexible in torsion, (b) Non-rotating pulse generating assemblies 5a and 5b, (c) Rotatable pulse generating means 12, 13 connected to rotate with said transmission shaft for cooperation with said non-rotating assemblies for generating spaced electrical pulses 15, 16, (d) Said rotatable pulse generating means being at least in part (pins 13) connected to a portion of the transmission shaft remote from the crankshaft (flywheel 6) whereby the timing of at least some of the pulses (16) generated thereby is dependent on torsional flexure of the transmission shaft and hence on the torque transmitted thereby, (e) Means 21, 22 connected to receive at least some of said pulses for generating a first signal V4, V5 representative of the speed of rotation of the transmission shaft, (f) Means for detecting the timing relationship between the torque-dependent pulses 16 and a crankshaft datum time $t$ for generating a second signal 17 (or 17' or 17") the timing of which relative to said datum time is representative of the torque transmitted by the transmission shaft, (g) And time delay means 23, 24 connected to the ignition means S for controlling energization thereof at a selected time X in relation to rotation of the crankshaft, said time delay means being connected to receive said first signal V4, V5 and said second signal 17, 17', 17" for advancing said selected time X in response to a variation of said first signal indicative of an increased speed of rotation of the transmission shaft and for retarding said selected time X in response to retardation of said second signal indicative of an increased torque transmitted by the transmission shaft.

I claim:

1. For use with an internal combustion engine having a crankshaft, distributor means connected in a predetermined timing relationship with said crankshaft and ignition means connected to said distributor means; an improved ignition timing system for controlling said ignition means, said timing system comprising:

(a) a transmission shaft connected to the crankshaft for transmission of torque, said transmission shaft being flexible in torsion, (b) non-rotating pulse generating assemblies, (c) rotatable pulse generating means connected to rotate with said transmission shaft for cooperation with said non-rotating assemblies for generating spaced electrical pulses, (d) said rotatable pulse generating means being at least in part connected to a portion of said transmission shaft remote from said crankshaft whereby the timing of at least some of the pulses generated thereby is dependent on torsional flexure of said transmission shaft and hence on the torque transmitted thereby, (e) means connected to receive at least some of said pulses for generating a first signal representative of the speed of rotation of said transmission shaft, (f) means for detecting the timing relationship between the torque-dependent pulses and a crankshaft datum time for generating a second signal the crankshaft timing of which relative to said datum time is representative of the torque transmitted by the transmission shaft, (g) and time delay means connected to the ignition means for controlling energization thereof at a selected time in relation to rotation of said crankshaft, said time delay means being connected to receive said first signal and said second signal for advancing said selected time in response to a variation of said first signal indicative of an increased speed of rotation of said transmission shaft and for retarding said selected time in response to retardation of said second signal indicative of an increased torque transmitted by said transmission shaft.

2. A system according to claim 1, wherein said time delay means (g) comprises:

(h) a capacitor, (i) means for discharging said capacitor for a period commencing at said datum time and extending for a length measured in clock time dependent on said second signal and on the speed of rotation of the shaft means, said length being increased by retardation of said second signal and decreased by increase of said speed, (j) means for recharging said capacitor immediately following the end of said period at a rate dependent on said first signal to increase said rate with increase of said speed, (k) and means sensitive to recharging of said capacitor to a predetermined level for generation of a further signal for initiation of said energisation of the ignition means.

3. A system according to claim 1, including:

(h) a first member mounted to rotate in synchronism with said crankshaft, (i) and a second member mounted on said remote portion of said transmission shaft to rotate in delayed synchronism with said first member, the magnitude of said delay increasing with torque in said transmission shaft, (j) said rotatable pulse generating means (c) being located on both said members for generating said spaced electrical pulses in said non-rotating pulse generating assemblies, first ones of such pulses generated by said pulse generating means on said first member defining said datum time and second ones of such pulses generated by said pulse generating means on said second member each being spaced from the respective said first pulse in terms of crankshaft degrees by an amount increasing with increased torque in said transmission shaft whereby said second pulses constitute said torque-dependent pulses.

4. A system according to claim 3, wherein said time delay means (g) comprises:

(k) a capacitor, (l) means for discharging said capacitor for a period commencing at said datum time and extending until a said second one of said pulses, (m) means for recharging said capacitor immediately following the end of said period at a rate dependent on said first signal to increase said rate with increase of said speed, (n) and means sensitive to recharging of said capacitor to a predetermined level for generation of a further signal for initiation of said energisation of the ignition means.

5. A system according to claim 1, wherein said time delay means (g) comprises:

(h) a capacitor, (i) means for discharging said capacitor for a period the length of which measured in clock time is decreased by increase in the speed of rotation of the shaft means and the moment of termination of which in terms of crankshaft degrees is retarded in relation to said datum time by retardation of said second signal, (j) means for recharging said capacitor immediately following the end of said period at a rate dependent on said first signal to increase said rate with increase of said speed, (k) and means sensitive to recharging of said capacitor to a predetermined level for generation of a further signal for initiation of said energisation of the ignition means.

6. A system according to claim 1, including:

(h) a member mounted on said remote portion of said transmission shaft to rotate in delayed synchronism with said crankshaft, the magnitude of said delay increasing with torque in said transmission shaft, and the position of said crankshaft defining said datum time, (i) said rotatable pulse generating means (c) being located on said member for generating said spaced electrical pulses in said non-rotating pulse generating assemblies, first ones of such pulses being spaced from said datum time in terms of crankshaft degrees by an amount increasing with increased torque in said transmission shaft, and second ones of such pulses being spaced from said first ones by a fixed amount in terms of crankshaft degrees, said second pulses constituting said torque-dependent pulses.

7. A system according to claim 6, wherein said time delay means (g) comprises:
(j) a capacitor,
(k) means for discharging said capacitor for a period commencing with a said first one of said pulses and terminating with a said second one of said pulses,
(l) means for recharging said capacitor immediately following the end of said period at a rate dependent on said first signal to increase said rate with increase of said speed,
(m) and means sensitive to recharging of said capacitor to a predetermined level for generation of a further signal for initiation of said energisation of the ignition means.

References Cited

UNITED STATES PATENTS

| | | | |
|---|---|---|---|
| 2,378,037 | 6/1945 | Reggio | 123—117 |
| 3,314,407 | 4/1967 | Schneider | 123—148 |

LAURENCE M. GOODRIDGE, Primary Examiner

U.S. Cl. X.R.

123—117, 148